Nov. 11, 1924.
J. B. SPERRY
1,514,871
SWIVEL FOR WELL DRILLING APPARATUS
Filed Feb. 27, 1924
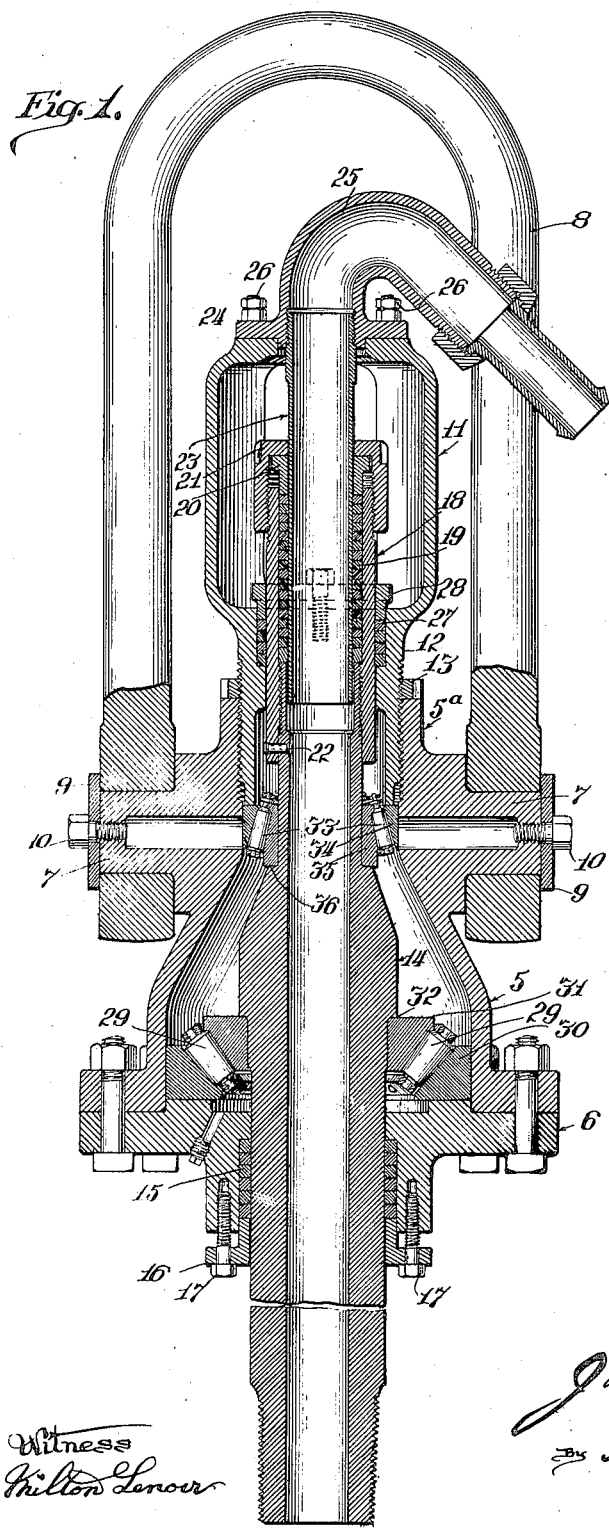
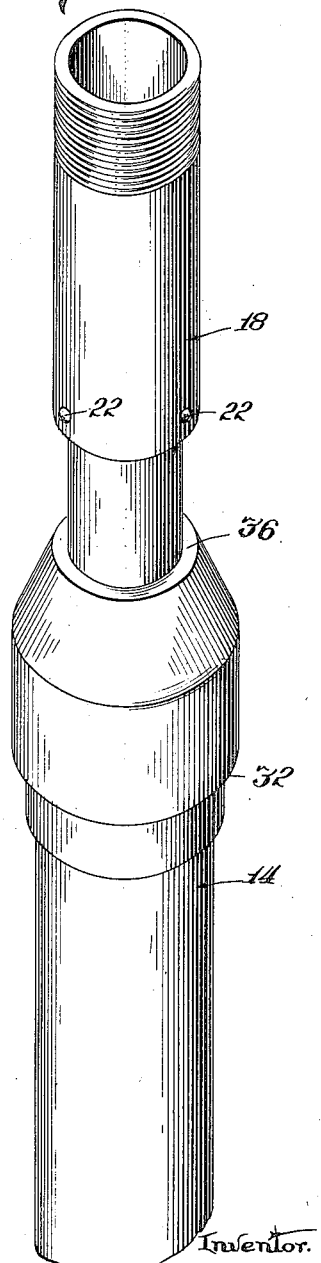

Patented Nov. 11, 1924.

1,514,871

UNITED STATES PATENT OFFICE.

JOHN B. SPERRY, OF AURORA, ILLINOIS, ASSIGNOR TO THE AMERICAN WELL WORKS, OF AURORA, ILLINOIS, A CORPORATION OF ILLINOIS.

SWIVEL FOR WELL-DRILLING APPARATUS.

Application filed February 27, 1924. Serial No. 695,608.

*To all whom it may concern:*

Be it known that I, JOHN B. SPERRY, a citizen of the United States, and a resident of Aurora, in the county of Kane and State of Illinois, have invented certain new and useful Improvements in Swivels for Well-Drilling Apparatus, of which the following is a specification, reference being had to the accompanying drawing.

This invention relates to improvements in swivels particularly designed for use in connection with the drill-rod employed in the forming of deep wells. Such a drill-rod is usually made of sections of four inch or six inch pipe screwed together and is necessarily of very great weight, so that the swivel from which the drill-rod depends must be very strong and heavy in order to furnish the required support. Such swivel devices are ordinarily provided with anti-friction devices so as to permit the desired smooth rotary movement of the stem therein to which the drill-rod is directly secured. In view of the great weight imposed upon such anti-friction devices it is necessary from time to time to adjust the swivel members to compensate for wear, and it is the object of my invention to provide a construction whereby a single adjustment of the parts will cause a simultaneous taking up of the wear in connection with each of the several bearing members. This object I accomplish by the construction and arrangement of parts shown in the drawing and hereinafter particularly described. That which is believed to be new will be set forth in the claims.

In the drawing,—

Fig. 1 is a vertical central section through a swivel device in which the invention is embodied; and Fig. 2 is an enlarged perspective view of the stem to which a drill-rod is directly connected and which is rotatably mounted in the swivel.

Referring to the figures of the drawing,— 5 indicates a hollow head, the flanged lower end of which rests upon and is bolted to a base plate 6, the wall of said head being inclined inwardly and upwardly and terminating at its upper portion in a cylindrical interiorly threaded thickened neck member 5ª with which are formed oppositely-extending trunnions 7 upon which is journaled a shackle or bail 8, which is held against accidental displacement by washers 9 and bolts 10. A housing is indicated by 11 which is provided at its lower end, as shown, with a neck portion 12 that is exteriorly threaded to adapt it to be screwed into the threaded neck portion 5ª of the head 5. A lock nut 13 screwed upon the neck portion 12 and against the upper end of the part 5ª prevents relative rotary movement between the head and the housing.

14 indicates a heavy cylindrical stem, the upper portion of which is located in the head 5, and to the lower end of which a tubular drill-rod is adapted to be connected as usual by the usual coupling. Around the stem and seated in an annular recess in the lower face of the base plate 6 are packing rings 15 held in place by an ordinary gland 16 adjustably secured by bolts 17 that screw into a central annular extension of said base. The upper end portion of the hollow stem is exteriorly threaded and onto such threaded portion is screwed a sleeve 18 which projects up into the housing 11. The sleeve and stem are held so as to rotate together by locking pins 22. Within this sleeve 18 is another sleeve 23, the lower end of which projects into the open upper end of the hollow stem and communicates with the bore thereof. Between the outer rotatable sleeve and the inner non-rotatable sleeve is a quantity of suitable packing 19 that is held properly compressed by a gland 20 that is held in place by a cap 21 screwed upon the upper end of the outer sleeve 18. The inner sleeve 23 projects through the upper wall of the housing 11 and is screwed fast to a flange 24 of a gooseneck 25, said goose-neck being secured to the housing by bolts 26. To this goose-neck is adapted to be coupled a hose pipe through which water, as usual, is forced down through the hollow stem and drill-rod into the bore of the well that is being formed. The outer sleeve 18 is shown as provided with packing 27 between it and the neck part 12 of the housing which is held forced down by a gland 28 against an inward annular shoulder on said part 12.

Interposed between the head 5 and the hollow stem 14 are two sets of anti-friction bearings, located one above the other, and each comprising a plurality of tapered rollers arranged between and bearing upon the opposed inclined faces of annular members that form the respective raceways for the rollers. The tapered rollers for the lower bearing are indicated by 29 and the outer and inner rings that such rollers bear against are indicated by 30 and 31, respectively. The member 30 rests upon the base 6 and the member 31 gives direct support to the stem 14 by reason of a shoulder 32 on such stem overlying and resting upon the member 31. In the upper set of anti-friction devices the rollers are indicated by 33 and the outer and inner rings by 34 and 35, respectively,—the member 34 being in contact with the lower edge of the neck part 12 of the housing 11 and the member 35 resting against a shoulder 36 on the stem. As clearly shown, the rollers of the lower set are inclined upwardly and outwardly from the stem and with their larger ends uppermost, while the rollers of the upper set are inclined outwardly and downwardly from the stem and with their larger ends downward. Now it is evident that with the parts so arranged a relative vertical movement between the housing 11 and the head 5 will result in a simultaneous readjustment of the positions of the bearing members of the two sets so as to compensate for wear. To effect this relative movement the lock-nut 13 is to be unscrewed sufficiently to permit the housing and the head to be relatively slightly turned with respect to each other in a direction that will tend to force down the bearing member 34 and to force upward the bearing member 30, after which the nut 13 will be again turned down tightly against the upper end of the neck portion 5ᵃ of the head. But a slight adjustment will be necessary of course to compensate for ordinary wear, but owing to the construction and arrangement of parts such adjustments can be very quickly and comparatively easily made, and, by reason of the readiness with which such operations can be performed, such adjustments may be made often enough to prevent the wearing of these bearings from injuriously affecting or impairing the smooth and even rotation of the stem and the drill-rod that is connected thereto.

It will be understood that the shackle or bail 8 will be supported in the usual manner from the upper portion of a derrick that is erected over the well that is being drilled, and that the drill-rod referred to will be engaged and rotated by any usual rotary mechanism.

What I claim as my invention and desire to secure by Letters Patent, is—

1. A swivel device comprising in combination a hollow head, a shackle or bail pivotally connected with opposite sides of said head, a rotatable stem centrally located in said head, two sets of anti-friction bearings located one above the other and interposed between said head and stem, each set comprising a plurality of tapered rollers with the larger ends of the rollers of one set uppermost and the larger ends of the rollers of the other set lowermost, and means for simultaneously adjusting a member of each of said sets of bearings.

2. A swivel device comprising in combination a hollow head, a shackle or bail pivotally connected with opposite sides of said head, a rotatable stem centrally located in said head, two sets of anti-friction bearings located one above the other and interposed between said head and stem, each set comprising a plurality of tapered rollers with the larger ends of the rollers of one set uppermost and the larger ends of the rollers of the other set lowermost, and an adjusting device in contact with a member of one of said sets of bearings, said device being adapted when turned relatively to said head to effect a movement of a member of each of said sets of bearings.

3. A swivel device comprising in combination a hollow head, a shackle or bail pivotally connected with opposite sides of said head, a rotatable stem centrally located in said head, two sets of anti-friction bearings located one above the other and interposed between said head and stem, each set comprising inner and outer annular members and a plurality of tapered rollers interposed between said members, the larger ends of the rollers of one set being uppermost and the larger ends of the rollers of the other set being lowermost, and means for simultaneously adjusting a member of each of said sets of bearings.

4. A swivel device comprising in combination a hollow head, a shackle or bail pivotally connected with opposite sides of said head, a rotatable stem centrally located in said head, two sets of anti-friction bearings located one above the other and interposed between said head and stem, each set comprising inner and outer annular members and a plurality of tapered rollers interposed between said members, the larger ends of the rollers of the lower set being uppermost and the larger ends of the rollers of the upper set being lowermost, and means for simultaneously adjusting a member of each of said sets of bearings.

5. A swivel device comprising in combination a hollow head, a shackle or bail pivotally connected with opposite sides of said head, a rotatable stem passing centrally through said head, two sets of anti-friction bearings located one above the other and interposed between said head and stem, each set comprising a plurality of tapered rollers with the larger ends of the rollers of one set uppermost and the larger ends of the other set lowermost, and a device having screw-threaded connection with the upper end of said head and in contact with a member of the upper set of bearings, said device being adapted when turned relatively to said head to effect a movement of a member of each of said sets of bearings.

6. A swivel device comprising in combination a hollow head, a shackle or bail pivotally connected with opposite sides of said head, a rotatable stem passing centrally through said head, two sets of anti-friction bearings located one above the other and interposed between said head and stem, each set comprising a plurality of tapered rollers with the larger ends of the rollers of one set uppermost and the larger ends of the other set lowermost, the rollers of one of said sets inclining upwardly away from said stem and the rollers of the other set inclining downwardly and away from said stem, and a device having screw-threaded connection with the upper end of said head and in contact with a member of the upper set of bearings, said device being adapted when turned relatively to said head to effect a movement of a member of each of said sets of bearings.

7. A swivel device comprising in combination a hollow head, a shackle or bail pivotally connected with opposite sides of said head, a rotatable hollow stem passing centrally through said head, a sleeve connected with the upper end of said stem and projecting above said head, a housing located between the upright parts of the shackle or bail and enclosing said sleeve, said housing being screwed into the upper end of said head, and two sets of anti-friction bearings interposed between said stem and head, each set comprising a plurality of tapered rollers, a member of the upper bearing being in contact with the lower edge of said housing.

JOHN B. SPERRY.